(12) United States Patent
Eoff et al.

(10) Patent No.: US 6,187,839 B1
(45) Date of Patent: Feb. 13, 2001

US006187839B1

(54) METHODS OF SEALING COMPOSITIONS AND METHODS

(75) Inventors: Larry Eoff, Duncan; David Brown, Temple, both of OK (US)

(73) Assignee: Halliburton Energy Services, Inc., Duncan, OK (US)

(*) Notice: Under 35 U.S.C. 154(b), the term of this patent shall be extended for 0 days.

(21) Appl. No.: 09/261,828

(22) Filed: Mar. 3, 1999

(51) Int. Cl.[7] .............................. C08K 7/00; E21B 33/13
(52) U.S. Cl. ...................... 523/130; 166/294; 166/295
(58) Field of Search .................... 523/130; 166/294, 166/295

(56) References Cited

U.S. PATENT DOCUMENTS

| | | |
|---|---|---|
| 3,334,689 | 8/1967 | McLaughlin ................ 166/33 |
| 3,490,533 | 1/1970 | McLaughlin ................ 166/270 |
| 3,727,691 | 4/1973 | Muecke ................ 166/295 |
| 5,335,726 | 8/1994 | Rodrigues ................ 166/295 |
| 5,358,051 | 10/1994 | Rodrigues ................ 166/295 |
| 5,840,784 | 11/1998 | Funkhouser et al. ............ 523/130 |
| 5,888,943 | * 3/1999 | Diggs et al. ................ 507/100 |

* cited by examiner

Primary Examiner—Kriellion Sanders
(74) Attorney, Agent, or Firm—Robert A. Kent; C. Clark Dougherty, Jr.

(57) ABSTRACT

The present invention provides methods of sealing subterranean zones using high density sealing compositions. The methods are basically comprised of introducing a sealing composition into the subterranean zone comprised of a high density aqueous salt solution, a polymerizable monomer and a polymerizable initiator and allowing said sealing composition to form a sealing gel in said zone.

22 Claims, No Drawings

METHODS OF SEALING COMPOSITIONS AND METHODS

BACKGROUND OF THE INVENTION

1. Field of the Invention

This invention relates to sealing subterranean zones penetrated by well bores using high density polymeric sealing compositions.

2. Description of the Prior Art

Wells which produce oil and/or gas very often also produce water. If the amount of water produced is low, the water can be separated from the oil and/or gas in an economical manner. However, if large quantities of water are produced by a well in addition to oil and/or gas, the cost of pumping, handling, storing and disposing of the produced water often makes the operation of the well uneconomical.

Polymeric compositions which form polymerized and cross-linked impermeable masses have been developed and used heretofore in well completion and remedial operations. For example, polymeric compositions have heretofore been used to reduce or terminate the flow of water from a subterranean zone penetrated by a well bore. Such compositions are introduced into a subterranean water producing zone and caused to polymerize and cross-link therein whereby a stable gel which reduces or terminates the water flow from the zone is formed therein. U.S. Pat. Nos. 3,334,689 issued Aug. 8, 1967 and 3,490,533 issued Jan. 20, 1970, both to McLaughlin, disclose polymerizable monomer solutions containing a polymerization catalyst for injection into subterranean zones. The solutions polymerize and are cross-linked in the zones to form stable gels which reduce the water permeabilities of the zones and decrease or terminate the flow of water therefrom.

U.S. Pat. Nos. 5,335,726 issued on Aug. 9, 1994 and 5,358,051 issued Oct. 25, 1994, both to Rodrigues, disclose methods of forming polymeric gels in subterranean zones to reduce or shut off the flow of water therefrom wherein a monomer is polymerized in the formation in the presence of a cross-linker by an initiator selected from certain azo compounds. Also, the use of hydroxy unsaturated carbonyl monomers is disclosed.

The aqueous polymerizable monomer solutions containing monomer or monomer and cross-linker and a polymerization initiator have heretofore been pumped as low viscosity solutions into subterranean zones in which sealing procedures are to be conducted. The low viscosity solutions polymerize after placement which results in the formation of sealing gels in the zones. The polymerization of the monomer solutions is not initiated by the polymerization initiators heretofore used and/or does not proceed at an appreciable rate until oxygen-induced polymerization inhibition is overcome. That is, a polymeric solution contains dissolved oxygen which inhibits the polymerization of the monomer in the solution until all of the oxygen is consumed. The time required for the initiator to react with the oxygen present in the solution is known as the "induction period." The induction period enables placement of the polymeric solution in the zone to be sealed before polymerization of the solution prevents its flow into the zone.

While various polymerization initiators such as persulfates, peroxides, oxidation-reduction systems and azo compounds have been utilized heretofore, azo compounds are generally preferred for the reason that they are less likely to cause premature gelation. Persulfates, peroxides and oxidation-reduction systems are subject to premature activation when they contact certain reactants such as ferrous ion.

In some wells, undesirable gas and/or water is produced into the well bore from subterranean zones penetrated thereby which makes the drilling of the well bore very difficult. For example, offshore wells in deep seawater are often drilled in a manner whereby the well bore is open to the sea floor. As a result, gas and/or water which flows into the well bore from subterranean zones cannot be controlled. That is, since the well bore is open, it cannot be isolated whereby a sealing composition can be pumped into the gas and/or water producing zones under pressure, i.e., the sealing composition cannot be squeezed into troublesome subterranean zones. Even in wells where pressure pumping operations can be carried out, it is often difficult to place a sealing composition in a subterranean zone because of its location, e.g., when the zone is near the bottom of the well bore.

Thus, there are needs for improved subterranean zone sealing compositions and methods which can be utilized in offshore well bores which are open to the sea floor as well as in other well bore sealing applications.

SUMMARY OF THE INVENTION

The present invention provides improved methods of sealing subterranean zones using high density subterranean zone sealing compositions which meet the needs described above and overcome the deficiencies of the prior art. A high density sealing composition of this invention can be spotted over a subterranean zone to be sealed and the high density of the composition causes it to flow into the zone to be sealed. Also, the high density sealing composition will migrate to the bottom of a well bore or zone.

The sealing compositions useful in accordance with this invention are basically comprised of a high density aqueous salt solution, a water soluble polymerizable monomer and a polymerization initiator. When the sealing composition is to be used at a temperature below about 70° F., an oxygen scavenger is also included therein to reduce the induction period and shorten the time for polymerization to take place.

A preferred composition of this invention is comprised of an aqueous zinc bromide solution having a density of about 15 pounds per gallon; a water soluble polymerizable monomer comprised of hydroxyethylacrylate and an azo polymerization initiator selected from the group of 2,2'-azobis (N,N'-dimethylene isobutyramidine) dihydrochloride, 2,2'-azobis(2-amidinopropane) dihydrochloride and 2,2'-azobis [2-methyl-N-(2-hydroxyethyl) propionamide].

The methods of this invention for sealing a subterranean zone penetrated by a well bore comprise the steps of introducing a high density sealing composition into the zone by way of the well bore comprising a high density salt solution, a water soluble polymerizable monomer and a polymerization initiator; and allowing the sealing composition to form a sealing gel in the zone.

It is, therefore, a general object of the present invention to provide improved methods of sealing subterranean zones using high density sealing compositions.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods and high density sealing compositions for carrying out well completion and remedial operations at temperatures in the range of from about 50° F. to about 170° F. The methods are particularly suitable for reducing or terminating the undesirable flow of water and/or gas from subterranean zones.

The uncontrolled and undesirable flow of water from subterranean zones is often encountered in offshore wells drilled through shallow sediments with the well bores open to the sea floor. The temperatures encountered are low which in combination with open well bores make treatments for reducing or terminating the flow of water very difficult. That is, because the well bores are open, they cannot be isolated whereby sealing compositions can be pumped into the water and/or gas producing zones under pressure. This problem is solved by the methods of the present invention which utilize high density polymeric sealing compositions. Such a high density composition can be spotted over a subterranean zone to be sealed, and as a result of the high hydrostatic pressure produced by the composition, it will flow into the subterranean zone to be sealed. Thereafter, the sealing composition is allowed to polymerize and form a sealing gel in the zone which reduces or terminates the flow of water and/or gas through the zone.

As mentioned, the high density compositions and methods of this invention can also be used in conventional offshore and on-shore wells where the subterranean zones producing undesirable flows of water and/or gas are difficult to seal with lightweight sealing compositions, e.g., the troublesome zones are near the bottom of the well bore. By the present invention, a high density sealing composition can be introduced into the well bore such as by the use of a dump-bailor and allowed to flow into a troublesome zone at the higher hydrostatic pressure produced. A dump-bailor is a tool well known to those skilled in the art which can be filled with a quantity of a high density fluid, lowered through a well bore containing drilling fluid to a desired location therein and then selectively operated to release the high density fluid into the well bore.

The improved polymeric compositions useful in accordance with this invention are basically comprised of a high density aqueous salt solution, a water soluble polymerizable monomer and a polymerization initiator.

The high density aqueous salt solution utilized can contain various salts. Preferably, the salt used is selected from the group of zinc bromide, calcium chloride, sodium chloride, potassium chloride and mixtures of such salts, with zinc bromide being the most preferred. The salt solution utilized preferably has a density in the range of from about 9 to about 18 pounds per gallon.

A variety of water soluble polymerizable monomers can be utilized in the polymeric compositions. Examples of such monomers include, but are not limited to, acrylic acid, methacrylic acid, acrylamide, methacrylamide, 2-methacrylamide-2-methyl propane sulfonic acid, 2-acrylamido-2-methyl propane sulfonic acid, N,N-dimethylacrylamide, vinyl sulfonic acid, N,N-dimethylaminoethylmethacrylate, 2-triethylammoniumethyl methacrylate chloride, N,N-dimethylaminopropylmethacrylamide, methacrylamidopropyl trimethylammonium chloride, N-vinyl pyrrolidone, vinyl phosphonic acid and methacryloyloxyethyl trimethylammonium sulfate and mixtures thereof. Additional more preferred monomers include hydroxyethylacrylate, hydroxymethylacrylate, hydroxyethylmethacrylate, N-hydroxymethylacrylamide, N-hydroxymethylmethacrylamide, polyethylene and polypropylene glycol acrylate and methacrylate, and mixtures thereof. Of these, hydroxyethylacrylate is most preferred.

The polymerizable monomer or monomers are included in the compositions of this invention in a general amount in the range of from about 5% to about 20% by weight of the compositions. Preferably, the polymerizable monomer or monomers are present in an amount in the range of from about 10% to about 15% by weight of the compositions, most preferably in an amount of about 15%.

The above monomers are often used in combination with cross-linking multi-functional vinyl monomers such as glycerol dimethacrylate and diacrylate, ethoxylated and propoxylated glycerol dimethacrylate and diacrylate, ethoxylated and propoxylated glycerol trimethacrylate and triacrylate, ethoxylated and propoxylated trimethylolpropane trimethacrylate and triacrylate, ethoxylated and propoxylated pentaerythritol di, tri and tetra methacrylate and acrylate, methylene-bis-acrylamide and methacrylamide, polyethylene and polypropylene glycol dimethacrylate and diacrylate, allylmethacrylate and acrylate, and mixtures thereof. When used, the cross-linking monomers are included in the polymeric compositions in an amount in the range of from about 0.005% to about 0.5% by weight of the compositions.

The polymerization initiators useful in accordance with this invention can be alkali metal persulfates, such as sodium persulfate, potassium persulfate and ammonium persulfate, peroxides such as hydrogen peroxide and tertiary-butyl hydro peroxide, oxidation-reduction systems employing oxidizers such as copper (I) and reducing agents such as bisulfate, and azo polymerization initiators. The quantity of the above mentioned initiators employed in the polymeric compositions is an amount in the range of from about 0.001% to about 2.0% by weight of the compositions, preferably from about 0.01% to about 1%, and still more preferably from about 0.05% to about 0.5%.

The initiators can be activated by temperature as well as by oxidation-reduction reactions (or both). However, in applications where the unintended activation of the initiators can be harmful, the use of the initiators is risky. For example, ferrous ion can be a reductant in an oxidation-reduction system including persulfate or peroxide initiators. Since ferrous ion is found in steel conduits employed in well bores, the probability of premature gelation is high. Accordingly, it has heretofore been the practice to clean or otherwise treat the steel conduits utilized to minimize the disassociation of ferrous ion therefrom before placing a polymeric composition of this invention therein. In view of the foregoing, azo initiators which are temperature activated at various temperatures and which are not activated by oxidation-reduction mechanisms are preferred.

The azo polymerization initiators which are suitable for use in accordance with this invention are defined by the following formula:

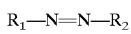

wherein:

$R_1$ is 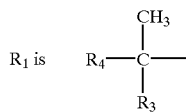

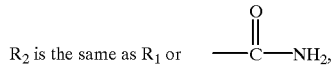

-continued

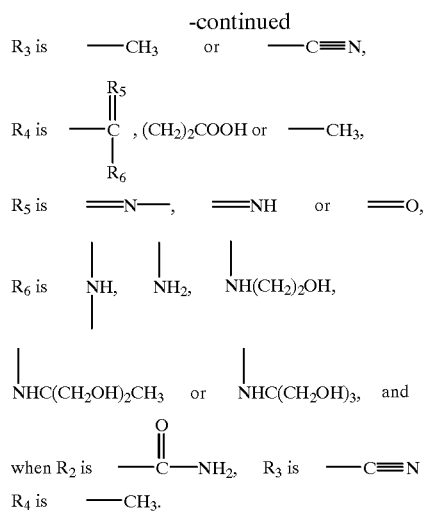

As is understood by those skilled in the art, a particular azo polymerization initiator can be selected for use in a polymeric composition of this invention which has an activation temperature equal to or slightly less than the temperature of the subterranean zone to be sealed. Further, since azo compounds are not activated by oxidation-reduction mechanisms, the reducing metals commonly encountered in pumping equipment and tubular goods of wells do not cause premature gelation of the polymeric compositions.

Examples of preferred azo compounds for use in accordance with this invention include, but are not limited to, 2,2'-azobis (N,N'-dimethylene isobutyramidine) dihydrochloride which has an activation temperature of 111° F., 2,2'-azobis(2-amidinopropane) dihydrochloride which has an activation temperature of 133° F. and 2,2'-azobis[2-methyl-N-(2-hydroxyethyl)propionamide which has an activation temperature of 187° F. These and other azo compounds can be utilized in the compositions of this invention to initiate polymerization at temperatures in the range of from about 70° F. to about 190° F. without the use of an oxygen scavenger. The quantity of azo initiator employed is generally an amount in the range of from about 0.001% to about 2% by weight of the polymeric composition.

When the compositions of this invention are utilized to seal subterranean zones having temperatures below about 70° F., an oxygen scavenger is included in the compositions to shorten the time before polymerization of the compositions takes place. While various oxygen scavengers can be utilized in accordance with this invention, a preferred oxygen scavenger which activates low concentrations of azo initiators in low temperature environments without generating reactive free radicals is stannous chloride ($SnCl_2 \cdot 2HOH$). When stannous chloride contacts dissolved oxygen and reacts therewith, it forms an insoluble oxychloride rather than free radicals which can cause premature gelation as do other oxygen scavenging compounds. In order to improve the solubility of stannous chloride whereby it can be readily combined with a polymeric composition, e.g., on the fly, the stannous chloride can be predissolved in a hydrochloric acid solution. For example, the stannous chloride can be dissolved in a 0.5% by weight aqueous hydrochloric acid solution in an amount of about 0.4% by weight of the resulting solution. When used, the stannous chloride is included in the polymeric compositions of this invention in an amount in the range of from about 0.005% to about 0.1% by weight of the compositions.

In carrying out the methods of this invention for sealing and plugging a subterranean zone penetrated by a well bore, a high density sealing composition as described above comprised of a high density aqueous salt solution, a water soluble polymerizable monomer and a polymerization initiator is introduced into the well bore and into, above or near the subterranean zone to be sealed, and then the sealing composition is allowed to polymerize in the zone or flow into the zone and then polymerize therein thereby forming a sealing and plugging gel in the zone.

In order to further illustrate the sealing compositions and methods of this invention, the following example is given.

EXAMPLE

The high density polymeric compositions of this invention were tested for gel times at various densities and at various temperatures. The test polymeric compositions were prepared by mixing 7.5 milliliters of hydroxyethylacrylate monomer with the appropriate aqueous salt solution to obtain the desired density. The aqueous salt solutions used were formed with fresh water and zinc bromide and had densities ranging from 11.2 pounds per gallon to 17.5 pounds per gallon. Two different azo initiators were used in various amounts and an oxygen scavenger (stannous chloride) was included in the compositions tested at 50° F.

The test solutions were poured into bottles containing marbles taking care to completely fill the bottles and exclude air as much as possible. The bottles were capped and placed in appropriate temperature water baths. The bottles were periodically inverted and the gel times were taken as the times when the solutions gained enough viscosity whereby the marbles no longer moved. Some of the compositions were mixed with 20/40 mesh sand and the resulting sand consolidations were tested 24 hours later for compressive strength.

The results of these tests are given in the Table below.

TABLE

| Temperature, °F. | Final Density, lb/gal | Polymerization Initiator, lb/1,000 gal | Oxygen Scavenger, lb/1,000 gal | Gel Time, hours | 20/40 Mesh Sand Pack - 24 Hr. Compressive Strength, psi |
|---|---|---|---|---|---|
| 125 | 11.2 | 62 | — | <1 | — |
| 125 | 11.2 | 16 | — | 3.5–4 | — |
| 165 | 11.2 | 4 | — | <1 | — |
| 165 | 11.2 | 2 | — | 2.5–3.7 | — |
| 125 | 13.4 | 47 | — | 5.5 < set < 21 | — |
| 50 | 13.5 | 20 | 1 | 2 | — |
| 50 | 13.5 | 15 | 1 | 2 | — |
| 50 | 13.5 | 10 | 1 | 6 | 22 |
| 50 | 13.5 | 5 | 1 | 8–24 | — |
| 50 | 15 | 20 | 1 | 3 | — |
| 50 | 15 | 15 | 1 | 3 | — |
| 50 | 15 | 10 | 1 | 8 | — |
| 125 | 15 | 15 | — | 24–48 | — |
| 125 | 15 | 30 | — | 2–17 | — |
| 125 | 15 | 43 | — | 7 | — |
| 125 | 15 | 47 | — | 4–6 | — |
| 125 | 15 | 62 | — | 3 | — |
| 150 | 15 | 2 | — | 8–23 | — |
| 150 | 15 | 10 | — | 5.5 | — |
| 150 | 15 | 10 | — | 2.5–3.5 | — |
| 150 | 15 | 15 | — | 0.5 | — |
| 165 | 15 | 1 | — | no set in 70 hrs. | — |
| 165 | 15 | 2 | — | 8–9 | — |
| 165 | 15 | 4 | — | 3.5–4 | — |
| 165 | 15 | 4 | — | 4.7–5.5 | — |

TABLE-continued

| Temperature, °F. | Final Density, lb/gal | Polymerization Initiator, lb/1,000 gal | Oxygen Scavenger, lb/1,000 gal | Gel Time, hours | 20/40 Mesh Sand Pack - 24 Hr. Compressive Strength, psi |
|---|---|---|---|---|---|
| 125 | 17.5 | 32 | — | 6.5–7 | — |
| 125 | 17.5 | 47 | — | 4–5 | — |
| 165 | 17.5 | 4 | — | 5.2–8 | — |
| 180 | 17.5 | 1 | — | 8–23 | — |
| 200 | 17.5 | 1 | — | 1–2 | — |

From the Table, it can be seen that the high density polymeric compositions of this invention can be caused to gel in desired times at various temperatures and can have various high densities.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of sealing a subterranean zone penetrated by a well bore comprising the steps of:
   introducing a high density sealing composition into said well bore, said composition comprising a high density aqueous salt solution, a water soluble polymerizable monomer and a polymerization initiator; and
   allowing said sealing composition to flow into said subterranean zone as a result of its high density and thereafter to polymerize and form a sealing gel in said zone.

2. The method of claim 1 wherein said high density aqueous salt solution in said composition contains a salt selected from the group of zinc bromide, calcium chloride, sodium chloride, potassium chloride and mixtures thereof.

3. The method of claim 2 wherein said high density aqueous salt solution in said composition has a density in the range of from about 9 to about 18 pounds per gallon.

4. The method of claim 1 wherein said polymerizable monomer in said composition is selected from the group of acrylic acid, methacrylic acid, acrylamide, methacrylamide, 2-methacrylamido-2-methyl propane sulfonic acid, 2-acrylamido-2-methyl propane sulfonic acid, N,N-dimethylacrylamide, vinyl sulfonic acid, N,N-dimethylaminoethylmethacrylate, 2-triethylammoniumethyl methacrylate chloride, N,N-dimethylaminopropylmethacrylamide, methacrylamidopropyl trimethylammonium chloride, N-vinyl pyrrolidone, vinyl phosphonic acid, methacryloyloxyethyl trimethylammonium sulfate, N-hydroxymethylacrylamide, hydroxyethylacrylate, hydroxyethylmethacrylamide, N-hydroxymethylmethacrylamide, and mixtures thereof.

5. The method of claim 4 wherein said polymerizable monomer in said composition is present in an amount in the range of from about 10% to about 15% by weight of said composition.

6. The method of claim 1 wherein said composition further comprises a cross-linking multi-functional vinyl monomer selected from the group of glycerol dimethacrylate and diacrylate, ethoxylated and propoxylated glycerol dimethacrylate and diacrylate, ethoxylated and propoxylated glycerol trimethacrylate and triacrylate, ethoxylated and propoxylated trimethylolpropane trimethacrylate and triacrylate, ethoxylated and propoxylated pentaerythritol di, tri and tetra methacrylate and acrylate, methylene-bisacrylamide and methacrylamide, polyethylene and polypropylene glycol dimethacrylate and diacrylate, allyl-methacrylate and acrylate, and mixtures thereof.

7. The method of claim 6 wherein said cross-linking monomer in said composition is present in an amount in the range of from about 0.005% to about 0.5% by weight of said composition.

8. The method of claim 1 wherein said polymerization initiator in said composition is an azo initiator selected from the group of 2,2'-azobis(N,N'-dimethylene isobutyramidine) dihydrochloride, 2,2'-azobis(2-amidinopropane) dihydrochloride and 2,2'-azobis[2-methyl-N-(2-hydroxyethyl)propionamide].

9. The method of claim 8 wherein said polymerization initiator in said composition is present in an amount in the range of from about 0.001% to about 2% by weight of said composition.

10. The method of claim 1 which further comprises an oxygen scavenger comprised of stannous chloride.

11. The method of claim 10 wherein said stannous chloride is present in said composition in an amount in the range of from about 0.005% to about 0.1% by weight of said composition.

12. A method of sealing a subterranean zone penetrated by a well bore comprising the steps of:
   introducing a high density sealing composition into said well bore and spotting it over said subterranean zone, said composition comprising a high density aqueous salt solution, a water soluble polymerizable monomer and a polymerization initiator;
   allowing said sealing composition to flow as a result of its high density and the high hydrostatic pressure produced thereby into said zone; and
   allowing said sealing composition to form a sealing gel therein.

13. The method of claim 12 wherein said high density aqueous salt solution in said composition contains a salt selected from the group of zinc bromide, calcium chloride, sodium chloride, potassium chloride and mixtures thereof.

14. The method of claim 10 wherein said high density aqueous salt solution in said composition has a density in the range of from about 9 to about 18 pounds per gallon.

15. The method of claim 12 wherein said polymerizable monomer in said composition is selected from the group of acrylic acid, methacrylic acid, acrylamide, methacrylamide, 2-methacrylamido-2-methyl propane sulfonic acid, 2-acrylamido-2-methyl propane sulfonic acid, N,N-dimethylacrylamide, vinyl sulfonic acid, N,N-dimethylaminoethylmethacrylate, 2-triethylammoniumethyl methacrylate chloride, N,N-dimethylaminopropylmethacrylamide, methacrylamidopropyl trimethylammonium chloride, N-vinyl pyrrolidone, vinyl phosphonic acid, methacryloyloxyethyl trimethylammonium sulfate, N-hydroxymethylacrylamide, hydroxyethylacrylate, hydroxyethylmethacrylamide, N-hydroxymethylmethacrylamide, and mixtures thereof.

16. The method of claim 15 wherein said polymerizable monomer in said composition is present in an amount in the range of from about 10% to about 15% by weight of said composition.

17. The method of claim 12 wherein said composition further comprises a cross-linking multi-functional vinyl monomer selected from the group of glycerol dimethacrylate and diacrylate, ethoxylated and propoxylated glycerol dimethacrylate and diacrylate, ethoxylated and propoxylated glycerol trimethacrylate and triacrylate, ethoxylated and propoxylated trimethylolpropane trimethacrylate and triacrylate, ethoxylated and propoxylated pentaerythritol di, tri and tetra methacrylate and acrylate, methylenebisacrylamide and methacrylamide, polyethylene and polypropylene glycol dimethacrylate and diacrylate, allylmethacrylate and acrylate, and mixtures thereof.

18. The method of claim 17 wherein said cross-linking monomer in said composition is present in an amount in the range of from about 0.005% to about 0.5% by weight of said composition.

19. The method of claim 12 wherein said polymerization initiator in said composition is an azo initiator selected from the group of 2,2'-azobis(N,N'-dimethylene isobutyramidine) dihydrochloride, 2,2'-azobis(2-amidinopropane) dihydrochloride and 2,2'-azobis[2-methyl-N-(2-hydroxyethyl)propionamide].

20. The method of claim 19 wherein said polymerization initiator in said composition is present in an amount in the range of from about 0.001% to about 2% by weight of said composition.

21. The method of claim 12 which further comprises an oxygen scavenger comprised of stannous chloride.

22. The method of claim 21 wherein said stannous chloride is present in said composition in an amount in the range of from about 0.005% to about 0.1% by weight of said composition.

* * * * *